(12) United States Patent
Cho et al.

(10) Patent No.: US 9,898,399 B2
(45) Date of Patent: Feb. 20, 2018

(54) MEMORY MANAGEMENT APPARATUS AND METHOD

(71) Applicant: ELECTRONICS AND TELECOMMUNICATIONS RESEARCH INSTITUTE, Daejeon (KR)

(72) Inventors: Moon Haeng Cho, Daejeon (KR); JongJin Won, Daejeon (KR); CheolOh Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 250 days.

(21) Appl. No.: 14/791,856

(22) Filed: Jul. 6, 2015

(65) Prior Publication Data

US 2016/0098345 A1 Apr. 7, 2016

(30) Foreign Application Priority Data

Oct. 2, 2014 (KR) .................. 10-2014-0133388

(51) Int. Cl.
*G06F 12/00* (2006.01)
*G06F 12/02* (2006.01)

(52) U.S. Cl.
CPC .... *G06F 12/023* (2013.01); *G06F 2212/1044* (2013.01)

(58) Field of Classification Search
None
See application file for complete search history.

(56) References Cited

U.S. PATENT DOCUMENTS

| 2011/0072199 A1* | 3/2011 | Reiter | ............. G06F 13/14 711/103 |
|---|---|---|---|
| 2013/0262748 A1* | 10/2013 | Chang | ............. G06F 12/145 711/103 |
| 2016/0062908 A1* | 3/2016 | Shen | ............. G11C 7/1072 711/103 |

FOREIGN PATENT DOCUMENTS

| KR | 10-1016036 B1 | 2/2011 |
|---|---|---|
| KR | 10-1154286 B1 | 6/2012 |

(Continued)

OTHER PUBLICATIONS

M. Masmano et al., "TLSF: a New Dynamic Memory Allocator for Real-Time Systems," Euromicro conference on Real-Time Systems, 2004.

(Continued)

*Primary Examiner* — John A Lane
(74) *Attorney, Agent, or Firm* — LRK Patent Law Firm

(57) ABSTRACT

A memory management apparatus and method are provided herein. The memory management apparatus includes a memory management list generation unit, a memory allocation unit, and a memory release unit. The memory management list generation unit generates a memory management list adapted to have all memory blocks divided into a plurality of memory blocks and to indicate whether each of the memory blocks has been allocated. The memory allocation unit allocates a memory region that belongs to the memory management list and that corresponds to an amount of memory requested for allocation in response to a memory allocation request. The memory release unit releases a memory region that belongs to the memory management list and that corresponds to a memory region to be released in response to a memory release request.

8 Claims, 9 Drawing Sheets

(56) References Cited

FOREIGN PATENT DOCUMENTS

| | | |
|---|---|---|
| KR | 10-2013-0111027 A | 10/2013 |
| KR | 10-2013-0124840 A | 11/2013 |

OTHER PUBLICATIONS

Moon-Haeng Cho et al., "Deterministic Memory Allocation Algorithm for Real-Time Systems," Papers of Korean Institute of Next Generation Computing, 2008.

* cited by examiner

```
void malloc(size, **foundBlock)
{
    int grp;
    FindMappingGrp(size, &grp);
    foundBlock = FindBlock(size, grp);
    ClearBlock(size, grp);
}
```

```
void free(*blockAddr, size)
{
    int blockCnt, blockPos;
    blockPos = FindMappingBlock(blockAddr, size, &blockCnt);
    SetBlock(blockPos, blockCnt);
}
```

FIG. 7

```
/* Lowest Bit Position Resolution Table */
char const LBPRTbl[16]
        = { 4, 0, 1, 0, 2, 0, 1, 0, 3, 0, 1, 0, 2, 0, 1, 0 };
```

FIG. 8

```
/* Continuous Bit Resolution Table */
char const CBRTbl[16]
      = { 0, 1, 1, 2, 1, 1, 2, 3, 1, 1, 1, 2, 2, 2, 3, 4 };
```

FIG. 9

| 255 | 254 | 253 | 252 | 251 | 250 | 249 | 248 | | 7 | 6 | 5 | 4 | 3 | 2 | 1 | 0 |
|---|---|---|---|---|---|---|---|---|---|---|---|---|---|---|---|---|
| 1 | 1 | 1 | 1 | 1 | 1 | 1 | 1 | ......... | 1 | 1 | 1 | 1 | 1 | 1 | 1 | 1 |

FIG. 10

MEMORY MANAGEMENT APPARATUS AND METHOD

CROSS-REFERENCE TO RELATED APPLICATION

This application claims the benefit of Korean Patent Application No. 10-2014-0133388, filed Oct. 2, 2014, which is hereby incorporated by reference herein in its entirety.

BACKGROUND

1. Technical Field

Embodiments of the present invention relate generally to a memory management apparatus and method and, more particularly, to a spatiotemporal deterministic memory management apparatus and method based on a multi-dimensional scheme, which consistently guarantee time complexity and space complexity regardless of the number of times memory is allocated and released in the management of limited memory resources in a real-time system having considerably limited hardware resources, such as a wearable personal computer (PC).

2. Description of the Related Art

A wearable PC may be defined as a real-time system device whose various hardware resources, such as the driving speed of a central processing unit (CPU), a battery, a memory capacity and a display size, are limited by a limited space and a heating problem due to the nature in which the wearable PC is worn on the human body. Accordingly, a real-time system device needs to use a real-time operating system that can predict the execution time of each kernel service in order to efficiently manage resources and also guarantee quality of service (QoS).

In a real-time system, the most important part is a schedulability analysis that determines whether tasks constituting an application program satisfy a time limitation condition. A real-time operating system needs to satisfy the termination time limits of all real-time tasks. Accordingly, the real-time operating system should be able to determine the worst execution time of tasks by analyzing whether tasks constituting an application program of a wearable PC satisfy the time limitation condition.

A wearable PC that uses limited memory resources and that has a time limitation condition needs to be provided with a dynamic memory management technique that is capable of efficiently managing memory resources used by real-time tasks constituting application programs. Furthermore, the dynamic memory management technique of the real-time operating system is a memory management technique that has spatiotemporal determinism that enables allocation and release times to be predicted, not a memory management technique that guarantees rapid response time.

Korean Patent Application Publication No. 10-2013-0124840 entitled "Efficient Memory Management Method Including Memory Allocation Method and Memory Release Method" proposes a method of efficiently managing memory by solving a segmentation phenomenon and predicting the amount of memory in actual use in an image processing system having the characteristic in which the allocation and release of memory are relatively sequential.

Furthermore, Korean Patent Application Publication No. 10-2013-0111027 entitled "Dynamic Memory Management Method in Embedded System" proposes a dynamic memory management method that splits data memory into blocks of fixed size, allocating and releasing the blocks on a block basis, and eliminating the causes of system malfunction attributable to a logical error and a stack-related error in a program.

Meanwhile, Korean Patent Application Publication No. 10-2013-0124840 uses a list scheme-based resource management technique in order to prevent a segmentation phenomenon by efficiently managing memory in an image processing system having the characteristic in which the allocation and release of memory are relatively sequential. In this case, the list scheme does not guarantee time determinism because all the nodes constituting a list need to be sequentially searched. Furthermore, this list scheme does not guarantee space determinism because the number of pieces of memory that are consumed by the addition of a head and tail indices for managing a list increases in proportion to the number of nodes within the list.

Moreover, Korean Patent Application Publication No. 10-2013-0111027 discloses a technique for sequentially searching the bits of a memory map that manages fixed memory blocks and allocating consecutive blocks within data memory. This sequential search scheme does not guarantee time determinism because the search overhead increases in proportion to the number of bits to be searched.

SUMMARY

At least some embodiments of the present invention are directed to the provision of a memory management apparatus and method, which are capable of managing limited memory resources via a predictable size memory management list and allocating and releasing memory in real time, in a real-time system having considerably limited memory resources, such as a wearable PC.

In accordance with an aspect of the present invention, there is provided a memory management apparatus, including: a memory management list generation unit configured to generate a memory management list adapted to have all memory blocks divided into a plurality of memory blocks and indicate whether each of the memory blocks has been allocated; a memory allocation unit configured to allocate a memory region that belongs to the memory management list and that corresponds to the amount of memory requested for allocation in response to a memory allocation request; and a memory release unit configured to release a memory region that belongs to the memory management list and that corresponds to a memory region to be released in response to a memory release request.

The memory management list may include: a memory table indicating an allocation state of each of the memory blocks; and a memory group organization comprising a plurality of memory groups having a hierarchical dimension relationship.

The memory table may have an array structure, including binary numbers each indicative of the allocation state of each of the memory blocks.

Each of the plurality of memory groups may include a bit corresponding to each of the binary numbers of the memory table.

The memory group organization may include a first memory group corresponding to the highest dimension of the memory group organization and a second memory group corresponding to a dimension below the dimension of the first memory group; and the memory management list generation unit generates a memory management list indicating that a memory, region belonging to the first memory group is allocable if all the bit values of the second memory group and the memory table corresponding to a specific bit of the first memory group have a specific value.

The memory group organization may further include a third memory group corresponding to a dimension below the dimension of the second memory group; and the memory management list generation unit may generate a memory management list indicating that a memory region belonging to the first memory group is allocable if all the bit values of the second and the third memory group, the memory table corresponding to a specific bit of the first memory group have a specific value.

When the memory allocation request is made, the memory allocation unit may search for a memory region suitable for a corresponding memory size via, a lowest bit position resolution table and a continuous bit position resolution table, and may indicate that the found memory region has been allocated by releasing the bit masking, of the memory group organization and the memory table corresponding to the found memory region.

When the memory release request is made, the memory release unit may indicate that a memory region to be released is allocable by performing bit masking on the memory group organization and the memory table corresponding to the memory region.

In accordance with an aspect of the present invention, there is provided a memory management method, including: generating, by a memory management list generation unit, a memory management list adapted to have all memory blocks divided into a plurality of memory blocks and indicate whether each of the memory blocks has been allocated; allocating, by a memory allocation unit, a memory region that belongs to the memory management list and that corresponds to an amount of memory requested for allocation in response to a memory allocation request; and releasing, by a memory release unit, a memory region that belongs to the memory management list and that corresponds to a memory region to be released in response to a memory release request.

BRIEF DESCRIPTION OF THE DRAWINGS

The above and other objects, features and advantages of the present invention will be more clearly understood from the following detailed description taken in conjunction with the accompanying drawings, in which:

FIG. 7 is a diagram illustrating pseudo code that enables the memory release unit of FIG. 1 to release memory;

FIG. 8 is a diagram illustrating a lowest bit position resolution table adopted in an embodiment of the present invention;

FIG. 9 a diagram illustrating a continuous bit position resolution table adopted in an embodiment of the present invention;

FIG. 10 is a diagram illustrating the step of splitting all memory blocks into memory blocks of fixed size and initializing the memory blocks in a memory management apparatus based on a four-dimensional scheme according to an embodiment of the present invention;

DETAILED DESCRIPTION

Figure 1:
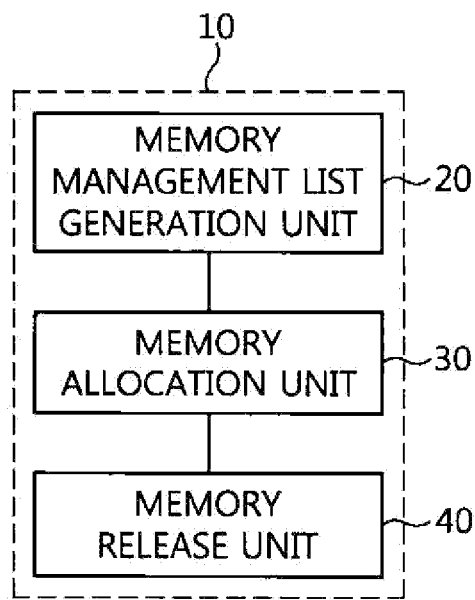
FIG. 1 is a block diagram illustrating a memory management apparatus according to an embodiment of the present invention.

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts, and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

FIG. 1 is a block diagram illustrating a memory management apparatus according to an embodiment of the present invention.

The memory management apparatus 10 according to the present embodiment includes a memory management list generation unit 20, a memory allocation unit 30, and a memory release unit 40.

The memory management list generation unit 20 splits all memory blocks into memory blocks of fixed size, and generates a bitmap (a memory management list) of predictable size indicating whether each of the memory blocks has an allocated state (denoted by "0"; bit masking release) or an unallocated state (denoted by "1"; bit masking). The memory management list generation unit 20 generates a memory table having an array structure composed of binary numbers in which each of the bits of a bitmap is indicative of the allocation state of each memory block, and a memory group organization including a plurality of memory groups having a hierarchical dimension relationship. In this case, each of the plurality of memory groups includes a bit corresponding to each of the binary numbers of the memory table.

That is, the memory management list may be viewed as including the memory table and the memory group organization.

The memory management list generation unit 20 may indicate each of all the memory blocks as a region not allocated to the memory management list in order to manage all the memory blocks as memory blocks of fixed size.

For example, when the memory management list generation unit 20 is applied to a memory management apparatus based on a 4-bit four-dimensional scheme, the memory management list generation unit 20 forms a first memory group, i.e., the highest dimension memory group of a memory group organization, using 4 bits. Furthermore, the memory management list generation unit 20 forms a second memory group MemMidGrp1[4] that has 4 bits for each of the four bits of the first memory group and that corresponds to the next-highest dimension, i.e., a dimension below the dimension of the first memory group MemGrp. Furthermore, the memory management list generation unit 20 forms a third memory group MemMidGrp2[4][4] that has 4 bits for each of the four bits of the second, memory group and that corresponds to the next-lowest dimension, i.e., a dimension below the dimension of the second memory group. Accordingly, when all the bit values of the second and the third memory group, the memory table MemTb1[4][4][4] corresponding to a specific bit of the first memory group are 1, the memory management list generation unit 20 may set the specific bit of the first memory group to "1." In this manner, the memory management list generation unit 20 may generate the memory management list indicating that an allocable memory region is present in the first memory group.

The memory allocation unit 30 may allocate memory corresponding to the amount of memory requested for allocation in the memory management list when a memory allocation request is made, and may indicate the allocated memory as an allocated memory region.

That is, the memory allocation unit 30 may indicate that a memory group corresponding to the size of memory to be allocated has been allocated. In other words, when a memory allocation request is made, the memory allocation unit 30 does not sequentially search a memory management list in order to search for a memory region suitable for a memory size, but searches for a memory region suitable for the memory size via a lowest bit position resolution table and a continuous bit position resolution table. Thereafter, the memory allocation unit 30 indicates that the memory region has been allocated by releasing the bit masking of a memory group organization and a memory table corresponding to the memory region.

The memory release unit 40 indicates that a memory region to be released is allocable by performing bit masking on a memory group organization and memory table corresponding to the memory region.

A memory allocation and release operation in a memory management apparatus according to an embodiment of the present invention is described below.

Figure 2:
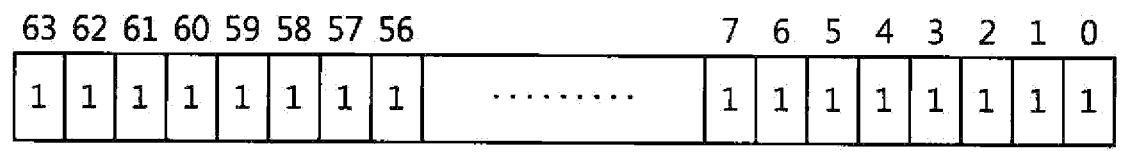
FIG. 2 is a diagram illustrating the step of splitting all memory blocks into memory blocks of fixed size and initializing the memory blocks in a memory management apparatus based on a three-dimensional scheme according to an embodiment of the present invention.
Figures 3, 4:
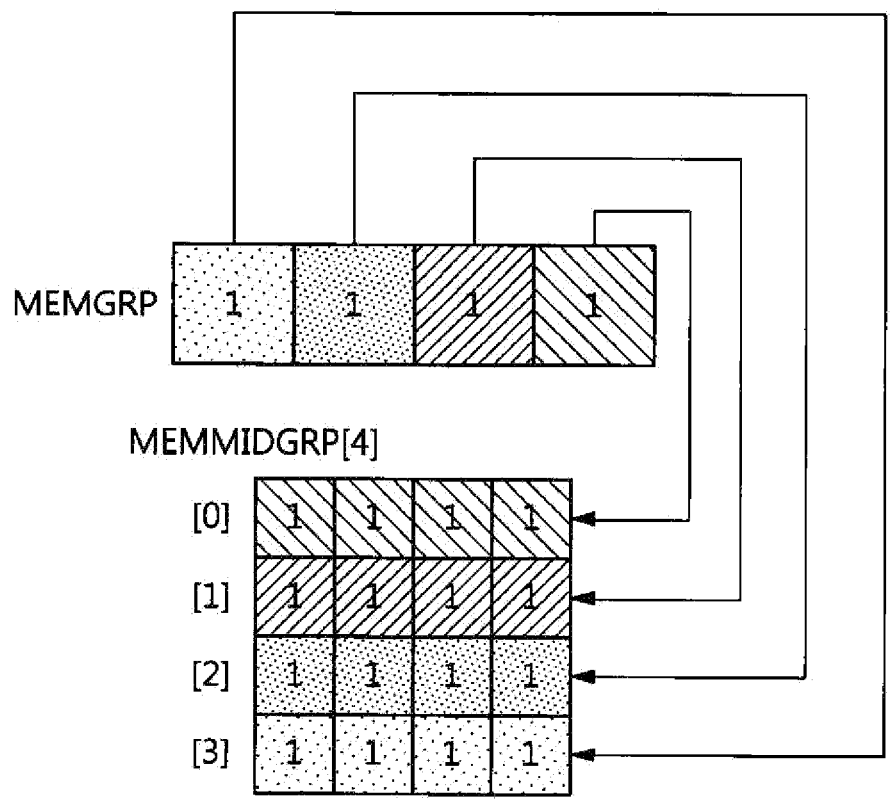
FIG. 3 is a diagram illustrating a three-dimensional-based memory group organization in a memory management apparatus based on a three-dimensional scheme according to an embodiment of the present invention.
FIG. 4 is a diagram illustrating a three-dimensional-based memory table in a memory management apparatus based on a three-dimensional scheme according to an embodiment of the present invention.
Figures 5, 6:
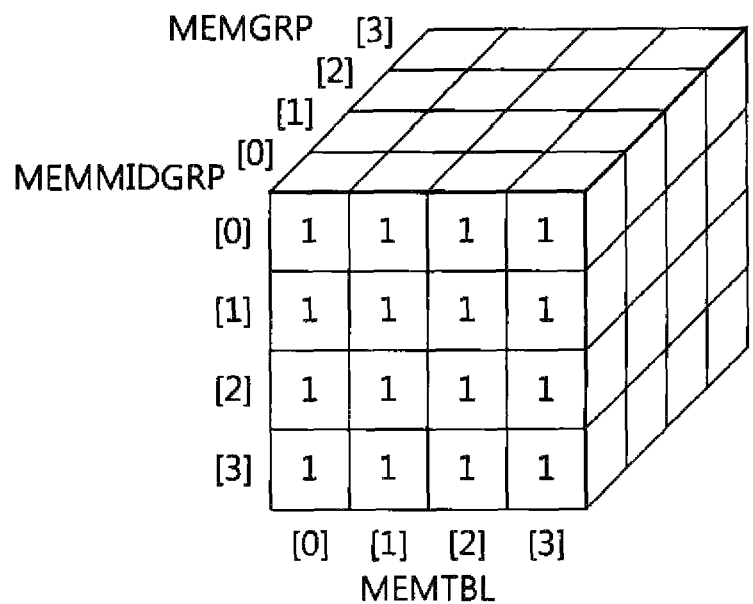
FIG. 5 is a diagram illustrating a three-dimensional-based memory management list in a memory management apparatus based on a three-dimensional scheme according to an embodiment of the present invention.
FIG. 6 is a diagram illustrating pseudo code that enables the memory allocation unit of FIG. 1 to allocate memory.

FIG. 2 is a diagram illustrating the step of splitting all memory blocks into memory blocks of fixed size and initializing the memory blocks in a memory management apparatus based on a three-dimensional scheme according to an embodiment of the present invention. FIG. 3 is a diagram illustrating a three-dimensional-based memory group organization in a memory management apparatus based on a three-dimensional scheme according to an embodiment of the present invention. FIG. 4 is a diagram illustrating a three-dimensional-based memory table in a memory management apparatus based on a three-dimensional scheme according to an embodiment of the present invention. FIG. 5 is a diagram illustrating a three-dimensional-based memory management list in a memory management apparatus based on a three-dimensional scheme according to an embodiment of the present invention. FIG. 6 is a diagram illustrating pseudo code that enables the memory allocation unit of FIG. 1 to allocate memory. FIG. 7 is a diagram illustrating pseudo code that enables the memory release unit of FIG. 1 to release memory. FIG. 8 is a diagram illustrating a lowest bit position resolution table adopted in an embodiment of the present invention. FIG. 9 is a diagram illustrating a continuous bit position resolution table adopted in an embodiment of the present invention.

In a 4-bit three-dimensional memory management list, all memory blocks may be split into 64 memory blocks of fixed size, as illustrated in FIG. 2. Furthermore, in the memory management list, the state of each of the memory blocks may be indicated by performing bit masking release or bit masking on the memory block depending on whether the memory block has been allocated or released.

Furthermore, as illustrated in FIG. 3, the memory management list generation unit 20 forms a first memory group MemGrp, i.e., the highest dimension memory group of the memory group organization, using 4 bits 0 to 3. Furthermore, the memory management list generation unit 20 forms a second memory group MemMidGrp[4] that has 4 bits for each of the four bits of the first memory group and that corresponds to the next-highest dimension, i.e., a dimension below the dimension of the first memory group.

Accordingly, when all the bit values of the second memory group and the memory table corresponding to a specific bit of the first memory group are set as "1" (see FIG. 4), the memory management list generation unit 20 may set the specific bit of the first memory group to "1." Accordingly, the memory management list generation unit 20 may generate a memory management list (see FIG. 5) so that it can indicate that the memory region of the first memory group is allocable. In the 4-bit three-dimensional memory management list illustrated in FIG. 5, the X axis denotes a memory table, the Y axis denotes the second memory group, and the Z axis denotes the first memory group.

In the above-described embodiment of the present invention, time complexity O(1) and space complexity O(1) are guaranteed in the allocation and release of memory because the lowest bit position resolution table and the continuous bit position resolution table are used and also the data variables of the first memory group, the second memory group, and the memory table are used.

A specific example is now described. For example, it is assumed that a total size of a memory region to be managed is 256 KB. In this case, the memory management list generation unit 20 based on a 4-bit three-dimensional scheme splits the memory region into 64 blocks of fixed size. Thereafter, the memory management list generation unit 20 generates a memory management list (see FIG. 5) including a first memory group, a second memory group, and a memory table, and initializes all bits to "1." In this case, the size of a 1-bit block of the memory table is 4 KB, the size of a 1-bit block of the second memory group is 16 KB, and the size of a 1-bit block of the first memory group is 64 KB.

When a memory allocation request of 6 KB is made after the 4-bit three-dimensional memory management list has been generated as described above, the memory allocation unit 30 selects an allocable memory group corresponding to a requested memory size in FindMappingGrp( ) of FIG. 6. The memory allocation unit 30 selects the second memory group because the requested memory size is larger than the size of 1 block of the memory table and smaller than the size of a 1 block of the second memory group.

Thereafter, in order to check whether an allocable memory region is present in the selected second memory group in FindBlock( ) of FIG. 6, the memory allocation unit 30 checks the position of the memory region to be allocated (the zeroth index of the second memory group MemMidGrp [0]) using the lowest bit position resolution table "LBPRTb1 [MemMidGrp[0]]=0, MemMidGrp[0]=15" of FIG. 8. In an embodiment of the present invention, the worst execution time may be viewed as occurring when there is no allocable memory region in the second memory group. The worst execution time is the time it takes to search the second memory group for an allocable memory region through a lowest bit position resolution table (see FIG. 8) and the time it takes to search the rows of all the memory tables MemTb1 [0][0]~MemTb1[3][3] for two consecutive memory blocks through a continuous bit position resolution table (see FIG. 9) because an allocable memory region is not present.

In the present embodiment, two blocks having a size of 4 KB, i.e., the size of 1 block of the memory table, need to be allocated because the memory allocation request is 6 KB. Furthermore, the worst execution time elapses twenty times, i.e., the sum of four times the worst execution time elapses until an allocable memory region is found in the second memory group through the lowest bit position resolution table and, sixteen times the worst execution time elapses until the two consecutive memory blocks are found in the memory table MemTb1[ ][ ] through the continuous bit position resolution table if an allocable memory region is not present in the second memory group.

As described above, in the present embodiment, time determinism is guaranteed because the worst execution time can be predicted when memory is allocated. Furthermore, space determinism is guaranteed because the number of bits forming a bitmap can be predicted.

In the above example, in order to indicate that an allocable and corresponding memory region in the second memory group has been allocated, the memory allocation unit 30 releases the bit masking of the bit value of the zeroth index of the selected second memory group MemMidGrp[0] ="1110" in ClearBlock( ) of FIG. 6. Furthermore, the memory allocation unit 30 indicates that the second memory group has been allocated by releasing the bit masking of the bit value of the zeroth index of the first memory group MemGrp="1110", i.e., the next-highest group that manages MemMidGrp[0].

Furthermore, the size of 6 KB requested for the allocation of memory corresponds to the size of two memory blocks. Accordingly, in order to indicate that two memory blocks corresponding to the zeroth index of the second memory group MemMidGrp[0]="110" have been allocated in a memory table MemTb1[0][0], the memory allocation unit 30 releases the bit masking of the bit values of the zeroth and first indices of the memory table MemTb1[0][0]="1100".

An example in which a memory allocation request of 24 KB is made is now described. When a request for the allocation of 24 KB memory is made, the memory allocation unit 30 selects the first memory group because 24 KB is larger than the size of the 1 block of the second memory group and smaller than the size of the 1 block of the first memory group in FindMappingGrp( ) of FIG. 6, as described above.

Thereafter, in order to check whether an allocable memory region is present in the selected first memory group MemGrp="1110" in FindBlock( ) of FIG. 6, the memory allocation unit 30 checks the location of the memory region to be allocated (the first index of the first memory group MemGrp) using the lowest bit position resolution table "LBPRTb1[MemGrp]=1, MemGrp=14" of FIG. 8. Thereafter, in order to indicate that the corresponding memory region has been allocated, the memory allocation unit 30 releases the bit masking of the bit value of the first index of the selected first memory group MemGrp="1100", managing the location of the memory region to be allocated, in ClearBlock( ) of FIG. 6. Furthermore, the memory allocation unit 30 indicates that, as a result of calculation based on the size of a 1-bit block of the second memory group, two memory blocks have been allocated to the size of 20 KB requested for the allocation of memory by releasing the bit masking of the bit values of the zeroth and first indices of the second memory group MemMidGrp[1]="1100". Furthermore, in order to release six memory blocks, corresponding to a value obtained by dividing the size of memory requested for allocation by the size of a memory table block, from the memory table, the memory allocation unit 30 releases the bit masking of the bit values of the zeroth to third indices of the memory table MemTb1[1][0]="0000" corresponding to the zeroth index of the second memory group, and releases the bit masking of the bit values of the zeroth and first indices of the memory table MemTb1[1][1]="1100" corresponding to the first index of the second memory group.

An example in which a request for the allocation of 100 KB memory is made is now described. When the request for the allocation of 100 KB memory is made, the memory allocation unit 30 selects the first memory block because 100 KB is larger than the size, i.e., 64 KB, of the first memory group in FindMappingGrp( ) of FIG. 6 as described above.

Thereafter, the memory allocation unit 30 checks whether two consecutive memory blocks are present in the selected first memory group in FindBlock( ) of FIG. 6 by calculating the size requested for the allocation of memory using the size of a 1-bit block of the selected first memory group. For this purpose, the memory allocation unit 30 checks whether an allocable memory region is present using the continuous bit position resolution table "CBRTb1[MemGrp]=2, MemGrp="1100"" of FIG. 9. That is, the memory region may be allocated because consecutive pieces of allocable memory are two blocks and requested pieces of memory are two blocks.

Accordingly, the memory allocation unit 30 checks the location of the memory region to be allocated using the lowest bit position resolution table "LBPRTb1[MemGrp]2, MemGrp=12" of FIG. 8.

Thereafter, in order to indicate that the memory region has been allocated, the memory allocation unit 30 releases the bit masking of the bit values of the second and third indices of the selected first memory group MemGrp="0000" in ClearBlock( ) of FIG. 6. Furthermore, the memory allocation unit 30 indicates that 64 KB has been allocated by releasing the bit masking of all the bit values of the zeroth to third indices of the second memory group MemMidGrp [2]="0000" managed by the second index of the first memory group and releasing the bit masking of all the bit values of the zeroth to third indices of the memory table MemTb1[2][0] to MemTb1[2][3] managed via the second memory group.

Furthermore, in order to indicate that the remaining 36 KB memory region has been allocated, the memory allocation unit 30 releases the bit masking of the bit values of the zeroth to second indices of the second memory group MemMidGrp[3]="1000" managed by the third index of the first memory group and releases the bit masking of the bit values of the zeroth to third indices of the memory table MemTb1[3][0] to MemTb1[3][1] and the bit value of the zeroth index of the memory table MemTb1[3][2] managed via the second memory group.

An example in which a request for the release of 6 KB memory allocated in a memory management list is made is now described. The memory release unit 40 checks the location of a memory table MemTb1[ ][ ] based on the address "blockAddr" of allocated memory in FindMappingBlock( ) of FIG. 7, and calculates the number of blocks based on the size of the allocated memory. Accordingly, the memory release unit 40 may be aware that the address of the allocated memory is the location of the memory table MemTb1[0][0] and the number of blocks is 2.

Accordingly, the memory release unit 40 indicates that the memory region to be released is allocable by masking the bit values of the zeroth and first indices of the memory table MemTb1[0][0] in SetBlock( ) of FIG. 7. Furthermore, the memory release unit 40 checks whether each row of the memory table MemTb1[0][0] is 1, and, if allocation can be performed, indicates that the memory region belongs to the second memory group is allocable by masking the bit value of the zeroth index of a second memory group MemMidGrp [0]="1111", i.e., the next-highest memory group that manages the memory table MemTb1[0][0]. Furthermore, the memory release unit 40 indicates that the memory region belongs to the first memory group is allocable by masking the bit value of the zeroth index of the first memory group MemGrp="1111", i.e., the highest memory group that manages the second memory group.

Although the generation of the 4-bit three-dimensional memory management list and the allocation and release of memory have been described in the above examples, the generation of a 4-bit four-dimensional memory management list and the allocation and release of memory are described below.

Figure 11:
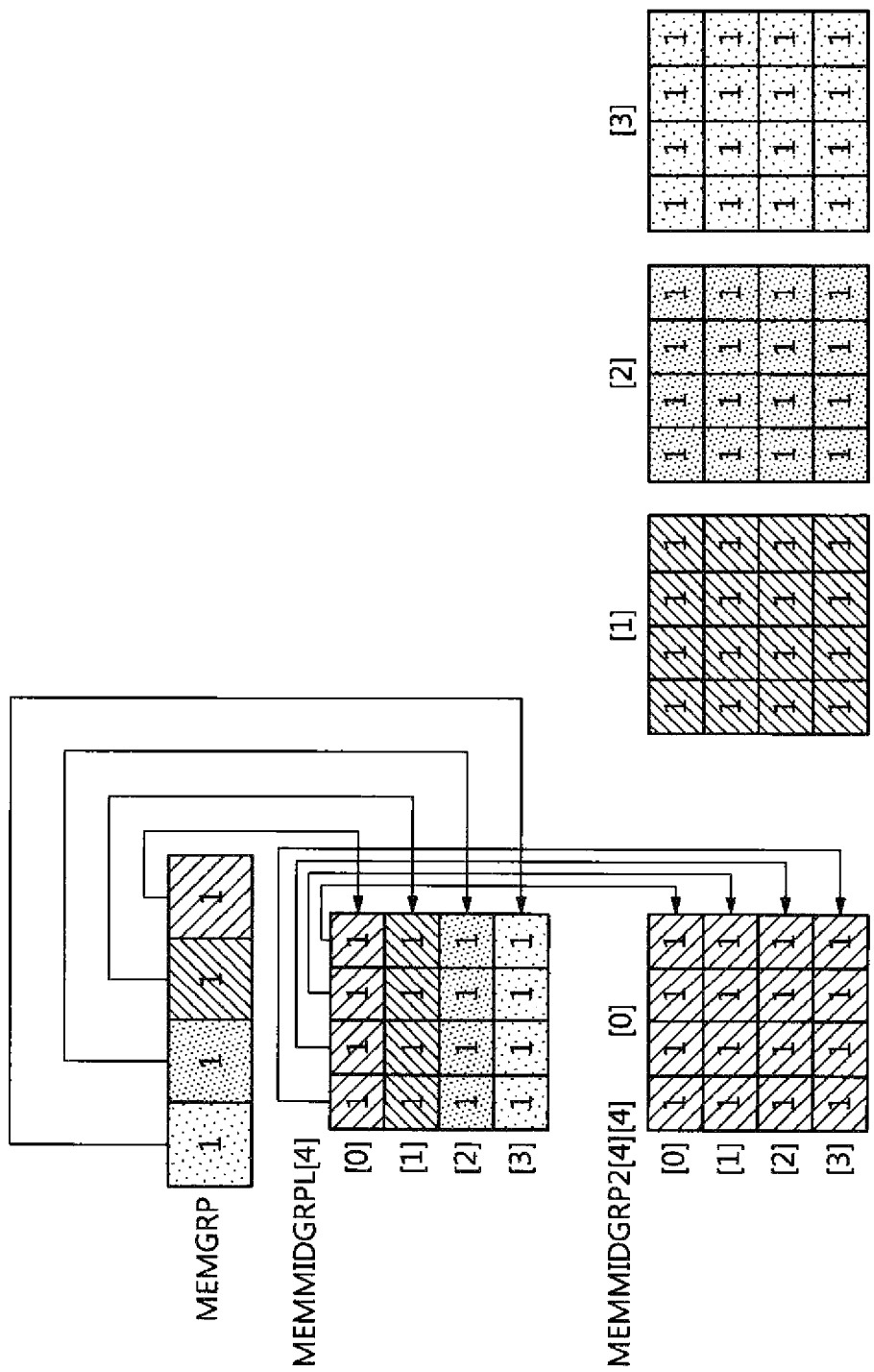
FIG. 11 is a diagram illustrating a four-dimensional-based memory group organization in a memory management apparatus based on a four-dimensional scheme according to an embodiment of the present invention.
Figure 12:
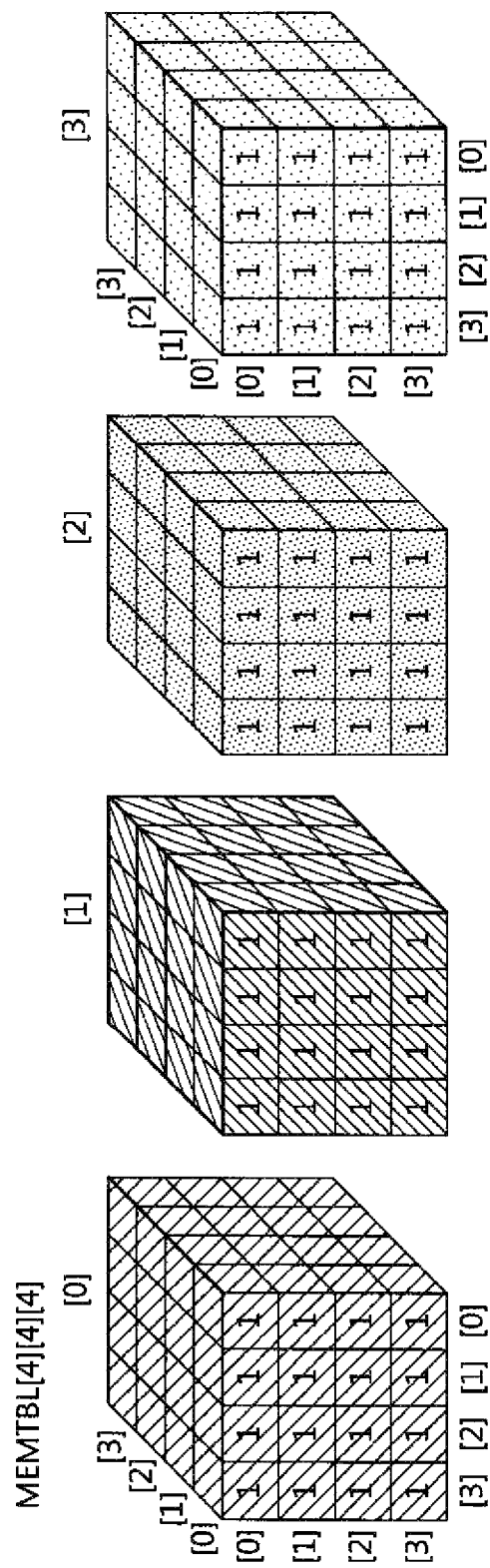
FIG. 12 is a diagram illustrating a four-dimensional-based memory table in a memory management apparatus based on a four-dimensional scheme according to an embodiment of the present invention.
Figure 13:
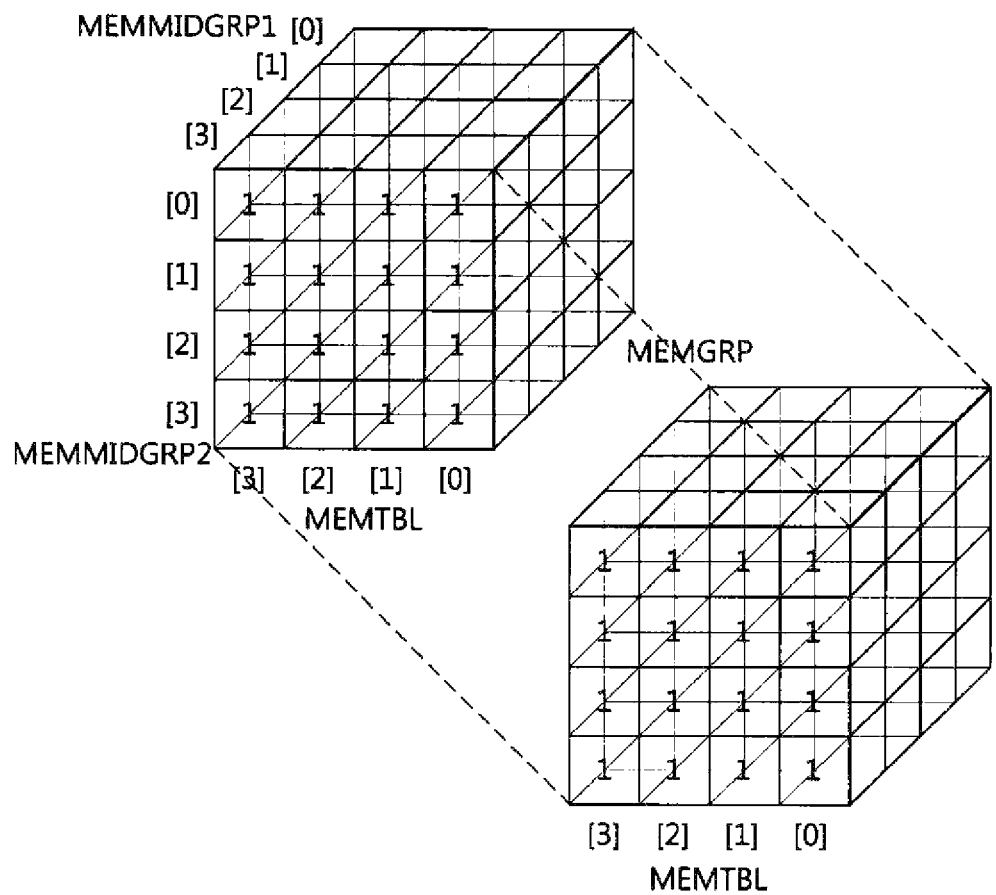
FIG. 13 is a diagram illustrating a four-dimensional-based memory management list in a memory management apparatus based on a four-dimensional scheme according to an embodiment of the present invention.

FIG. 10 is a diagram illustrating the step of splitting all memory blocks into memory blocks of fixed size and initializing the memory blocks in a memory management apparatus based on a four-dimensional scheme according to an embodiment of the present invention. FIG. 11 is a diagram illustrating a four-dimensional-based memory group organization in a memory management apparatus based on a four-dimensional scheme according to an embodiment of the present invention. FIG. 12 is a diagram illustrating a four-dimensional-based memory table in a memory management apparatus based on a four-dimensional scheme according to an embodiment of the present invention. FIG. 13 is a diagram illustrating a four-dimensional-based memory management list in a memory management apparatus based on a four-dimensional scheme according to an embodiment of the present invention.

In the 4-bit four-dimensional memory management list, all memory blocks may be split into 64 memory blocks of fixed size, as illustrated in FIG. 10. Furthermore, in the 4-bit four-dimensional memory management list, the state of each of memory blocks may be indicated by performing bit masking release or bit masking on each memory block depending on whether the memory block has been allocated or released.

Furthermore, as illustrated in FIG. 11, the memory management list generation unit 20 forms a first memory group MemGrp, i.e., the highest dimension memory group of a memory group organization, using 4 bits. Furthermore, the memory management list generation unit 20 forms the second memory group MemMidGrp1[4] that has 4 bits for each of the four bits of the first memory group and that corresponds to the next-highest dimension, i.e., a dimension below the dimension of the first memory group. Furthermore, the memory management list generation unit 10 forms a third memory group MemMidGrp2[4][4] that has 4 bits for each of the four bits of the second memory group and that corresponds to the next-lowest dimension, a dimension below the dimension of the second memory group.

Accordingly, when all the bit values of the second memory group MemMidGrp1[4] corresponding to a specific bit of the first memory group MemGrp and the third memory group MemMidGrp2[4][4] corresponding to a specific bit of the second memory group, and the memory table corresponding to a specific bit of the third memory group (see FIG. 12) are set as "1", the memory management list generation unit 10 set the specific bit of the first memory group to "1." Accordingly, the memory management list generation unit 10 may generate a memory management list (see FIG. 13) in order to indicate that a memory region belonging to the first memory group is allocable.

The above-described embodiment of the present invention, time complexity O(1) and space complexity O(1) are guaranteed in the allocation and release of memory because the lowest bit position resolution table and the continuous bit position resolution table are used and also the data variables of the first memory group, the second memory group, the third memory group, and the memory table are used.

For example, it is assumed that the total size of a memory region to be managed is 1024 KB. In this case, the memory management list generation unit 20 based on a 4-bit four-dimensional scheme splits an overall memory region into 256 memory blocks of fixed size. Furthermore, the memory management list generation unit 20 generates a memory management list, including the first memory group, the second memory group, the third memory group and the memory table, and initializes all the bits to "1." In this case, the size of a 1-bit block of the memory table of the memory management list generation unit 20 is 4 KB, the size of a 1-bit block of the third memory group is 16 KB, the size of a 1-bit block of the second memory group is 64 KB, and the size of a 1-bit block of the first memory group is 256 KB.

When a request for the allocation of 6 KB memory is made after the 4-bit four-dimensional memory management list has been generated as described above, the memory allocation unit 30 selects the third memory group in FindMappingGrp( ) of FIG. 6, and allocates two blocks.

Thereafter, in order to check whether an allocable memory region is present in the selected third memory group in FindBlock( ) of FIG. 6, the memory allocation unit 30 checks the position of the memory region (the zeroth index of the third memory group MemMidGrp2[0][0]) using the lowest bit position resolution table "LBPRTb1[MemMidGrp2[0][0]]=0, MemMidGrp2[0][0]=15" of FIG. 8.

Thereafter, in order to indicate that the corresponding memory region has been allocated, the memory allocation unit 30 releases the bit masking of the bit value of the zeroth index of the selected third memory group MemMidGrp2[0][0]="1110", which manages the position of the memory region to be allocated, in ClearBlock( ) of FIG. 6. Furthermore, the memory allocation unit 30 releases the bit masking of the bit value of the zeroth index of the second memory group MemMidGrp1[0]="1110", i.e., the next-highest group that manages the third memory group. Furthermore, the memory allocation unit 30 releases the bit masking of the bit value of the zeroth index of the first memory group MemGrp="1110", i.e., the highest group that manages the second memory group.

Furthermore, the memory allocation unit 30 releases the bit masking of the bit values of the zeroth and first indices of the memory table MemTb1[0][0][0]="1100" in order to indicate that the two calculated blocks have been allocated to a memory table MemTb1[0][0][0] corresponding to the zeroth index of the third memory group MemMidGrp2[0][0]="1110".

When the request for the release of 6 KB memory allocated in the 4-bit four-dimensional memory management list is made, those skilled in the art will readily understand the operation of releasing the allocated memory based on the aforementioned operation of releasing memory allocated in the 4-bit three-dimensional memory management list.

In this manner, the memory allocation/release method based on a three-dimensional scheme may be extended to a memory allocation/release method based on a four-dimensional scheme. Even in the memory allocation/release method based on a four-dimensional scheme, when a memory allocation/release request is made, bit masking or bit masking release is performed on memory groups and a memory table using a memory management list, a lowest bit position resolution table, and a continuous bit position resolution table. Accordingly, it may be possible to dynamically allocate and release memory while guaranteeing time complexity O(1) and space complexity O(1).

Figure 14:
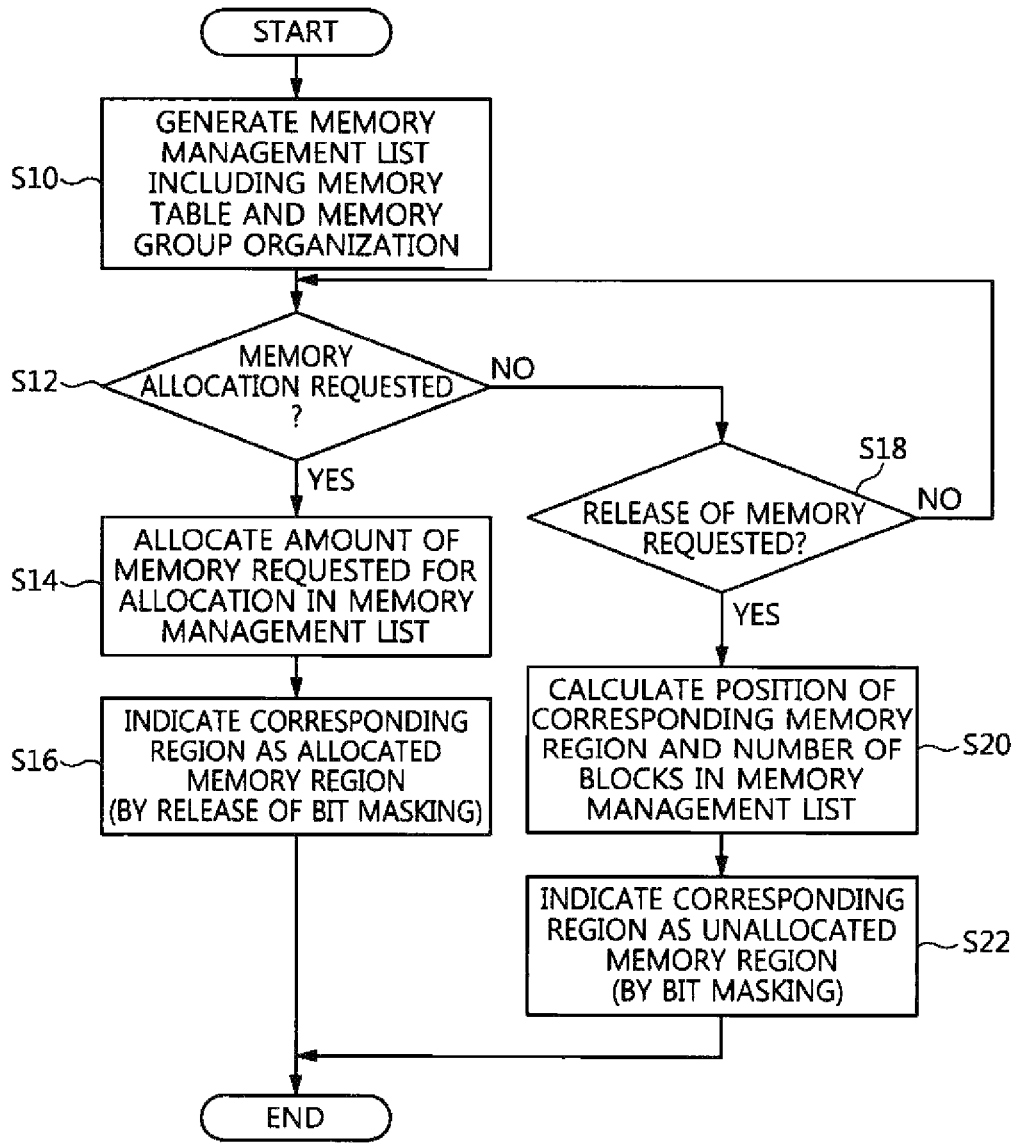
FIG. 14 is a flowchart illustrating a memory management method according to an embodiment of the present invention.

FIG. 14 is a flowchart illustrating a memory management method according to an embodiment of the present invention.

First, the memory management list generation unit 20 generates a memory management list (see FIGS. 5 and 13) including a memory table and a memory group organization at step S10.

When a memory allocation request is made ("Yes" at step S12), the memory allocation unit 30 indicates a corresponding region as an allocated memory region by performing memory allocation corresponding to the amount of memory requested for allocation in the memory management list at steps S14 and S16. That is, the memory allocation unit 30 searches for the memory region, corresponding to the amount of memory requested for allocation, via the lowest bit position resolution table and the continuous bit position resolution table, and releases the bit masking of a memory group organization and a memory table corresponding to the corresponding memory region. The allocated memory region is indicated by the release of bit masking.

When the memory release request corresponding to a specific memory region allocated in the memory management list is made ("Yes" at step S18), the memory release unit 40 indicates that the corresponding memory region is allocable by performing bit masking on a memory group organization and memory table corresponding to the corresponding memory region (i.e., a region corresponding to the amount of memory that has been requested and can be released) in the memory management list at steps S20 and S22. That is, when the memory release request is made, the position of the corresponding memory region and the number of blocks in the memory management list are calculated, and then bit masking is performed.

As described above, in accordance with the at least some embodiments of the present invention, a spatiotemporal deterministic memory management apparatus based on a multi-dimensional scheme having time complexity O(1) and space complexity O(1) can be implemented by efficiently managing limited memory resources in a real-time system having considerably limited hardware resources, such as a wearable PC.

Furthermore, a spatiotemporal deterministic memory management apparatus always having time complexity O(1) and space complexity O(1) can be implemented by expanding a dimension or controlling the size of a fixed memory block in response to an increase in memory capacity.

As described above, the optimum embodiments have been disclosed in the drawings and the specification. Although the specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. A memory management apparatus, comprising:
a memory management list generation unit configured to generate a memory management list which indicates all memory blocks being divided into a plurality of memory blocks and indicates whether each of the memory blocks being allocated;
in response to receipt of a memory allocation request, a memory allocation unit configured to allocate a memory region that belongs to the memory management list, the allocated memory region corresponding to an amount of memory requested for allocation; and
in response to receipt of a memory release request, a memory release unit configured to release a memory region that belongs to the memory management list, the released memory region corresponding to a memory region to be released, wherein
the allocated memory region and released memory region are indicated by bit masking on the memory management list corresponding to a memory region depending on whether the memory region being allocated or released in response to receipt of the memory allocation request or the memory release request, wherein
the memory management list comprises:
a memory table indicating an allocation state of each of the memory blocks, and a memory group organization comprising a plurality of memory groups having a hierarchical dimension relationship, wherein the memory group organization comprises a first memory group corresponding to a highest dimension of the memory group organization and a second memory group corresponding to a dimension below a dimension of the first memory group, and the memory management list generation unit generates a memory management list which indicates an allocable memory region belonging to the first memory group if all the bit values of the second memory group and the memory table which corresponding to a bit value of the first memory group having the same value, and wherein the memory group organization further comprises a third memory group corresponding to a dimension below a dimension of the second memory group, and the memory management list generation unit generates a memory management list which indicates an allocable memory region belonging to the first memory group if all the bit values of the second and the third memory group and the memory table corresponding to a bit value of the first memory group having the same value.

2. The memory management apparatus of claim 1, wherein the memory table has an array structure, including binary numbers each indicative of the allocation state of each of the memory blocks.

3. The memory management apparatus of claim 2, wherein each of the plurality of memory groups comprises a bit corresponding to each of the binary numbers of the memory table.

4. The memory management apparatus of claim 1, wherein in response to receipt of the memory allocation request, the memory allocation unit searches for a memory region suitable for a corresponding memory size via a lowest bit position resolution table and a continuous bit position resolution table, and indicates the memory region whether the memory region being allocated, the indication being performed by releasing bit masking of the memory group organization and the memory table which corresponding to the memory region.

5. The memory management apparatus of claim 1, wherein in response to receipt of the memory release request, the memory release unit indicates the memory region whether the memory region not being allocated by bit masking on the memory group organization and the memory table which corresponding to the memory region.

6. A memory management method, comprising:
generating, by a memory management list generation unit, a memory management list adapted to have all memory blocks divided into a plurality of memory blocks and indicate whether each of the memory blocks has been allocated;

in response to receipt of a memory allocation request, allocating, by a memory allocation unit, a memory region that belongs to the memory management list, the allocated memory region corresponding to an amount of memory requested for allocation; and in response to receipt of a memory release request, releasing, by a memory release unit, a memory region that belongs to the memory management list, the released memory region corresponding to a memory region to be released, wherein the allocated memory region and released memory region are indicated by bit masking on the memory management list corresponding to a memory region depending on whether the memory region being allocated or released in response to receipt of the memory allocation request or the memory release request, wherein the memory management list comprises:
a memory table indicating an allocation state of each of the memory blocks; and
a memory group organization comprising a plurality of memory groups having a hierarchical dimension relationship, wherein the memory group organization comprises a first memory group corresponding to a highest dimension of the memory group organization and a second memory group corresponding to a dimension below a dimension of the first memory group, and generating the memory management list which indicates an allocable memory region belonging to the first memory group if all the bit values of the second memory group and the memory table corresponding to a bit value of the first memory group having the same value, and wherein the memory group organization further comprises a third memory group corresponding to a dimension below a dimension of the second memory group, and generating the memory management which indicates an allocable memory region belonging to the first memory group if all the bit values of the second and the third memory group and the memory table corresponding to a bit value of the first memory group having the same value.

7. The memory management method of claim 6, wherein allocating the memory region comprises:
in response to receipt of the memory allocation request, searching for the memory region suitable for a corresponding memory size via a lowest bit position resolution table and a continuous bit position resolution table; and
indicating the found memory region whether the memory region being allocated, the indication being performed by releasing bit masking of the memory group organization and the memory table which corresponding to the memory region.

8. The memory management method of claim 6, wherein in response to receipt of the memory release request, indicating the memory region whether the memory region not being allocated by bit masking on the memory group organization and the memory table which corresponding to the memory region.

* * * * *